US009969271B2

(12) United States Patent
Ogawa

(10) Patent No.: US 9,969,271 B2
(45) Date of Patent: May 15, 2018

(54) HYBRID VEHICLE CONTROL APPARATUS

(71) Applicant: Toyota Jidosha Kabushiki Kaisha, Toyota-shi, Aichi-ken (JP)

(72) Inventor: Yuki Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/216,033

(22) Filed: Jul. 21, 2016

(65) Prior Publication Data

US 2017/0021730 A1 Jan. 26, 2017

(30) Foreign Application Priority Data

Jul. 22, 2015 (JP) ................................ 2015-145351

(51) Int. Cl.
*B60L 7/16* (2006.01)
*B60L 7/20* (2006.01)
(Continued)

(52) U.S. Cl.
CPC ................ *B60L 7/20* (2013.01); *B60K 6/445* (2013.01); *B60L 7/16* (2013.01); *B60L 7/18* (2013.01); *B60L 11/1859* (2013.01); *B60L 11/1862* (2013.01); *B60W 10/06* (2013.01); *B60W 10/08* (2013.01); *B60W 10/26* (2013.01); *B60W 20/12* (2016.01); *B60W 20/14* (2016.01);
(Continued)

(58) Field of Classification Search
CPC ...... B60L 7/16; B60L 7/18; B60L 7/20; B60L 11/1859; B60L 11/1862; B60L 2240/12; B60L 2240/423; B60L 2240/622; B60L 2240/642; B60W 20/14; B60W 30/18127; B60W 10/08; B60W 10/26; B60W 2550/142; B60W 2710/08; B60W 2710/244; B60Y 2200/92; Y02T 10/7005
USPC ........................................................... 701/22
See application file for complete search history.

(56) References Cited

U.S. PATENT DOCUMENTS 5,778,326 A 7/1998 Moroto et al.
2008/0319596 A1 12/2008 Yamada
(Continued)

FOREIGN PATENT DOCUMENTS

JP 2000-134719 A 5/2000
JP 2004101245 A 4/2004
(Continued)

OTHER PUBLICATIONS

Office Action dated Jun. 16, 2017 in U.S. Appl. No. 15/215,272.

*Primary Examiner* — Atul Trivedi
(74) *Attorney, Agent, or Firm* — Dinsmore & Shohl LLP

(57) ABSTRACT

A control apparatus for a hybrid vehicle including an internal combustion engine, a motor, and a storage battery and configured to charge the storage battery with electric power generated as a result of regenerative braking and electric power generated by using output of the engine. When a planned travel route of the vehicle includes a downhill section, the control apparatus executes a downhill control which decreases the remaining capacity of the storage battery before the vehicle enters the downhill section. In addition, when the downhill section includes a congestion section and the total distance of the congestion section is greater than a predetermined threshold, the control apparatus does not execute the downhill control.

2 Claims, 9 Drawing Sheets

(51) Int. Cl.

| | |
|---|---|
| ***B60W 10/08*** | (2006.01) |
| ***B60W 10/26*** | (2006.01) |
| ***B60W 30/18*** | (2012.01) |
| ***B60W 20/14*** | (2016.01) |
| ***B60L 7/18*** | (2006.01) |
| ***B60L 11/18*** | (2006.01) |
| ***B60K 6/445*** | (2007.10) |
| ***B60W 10/06*** | (2006.01) |
| ***B60W 20/12*** | (2016.01) |

(52) U.S. Cl.

CPC .... *B60W 30/18127* (2013.01); *B60L 2240/12* (2013.01); *B60L 2240/423* (2013.01); *B60L 2240/622* (2013.01); *B60L 2240/642* (2013.01); *B60W 2550/142* (2013.01); *B60W 2550/143* (2013.01); *B60W 2550/145* (2013.01); *B60W 2550/20* (2013.01); *B60W 2550/306* (2013.01); *B60W 2550/402* (2013.01); *B60W 2710/244* (2013.01); *Y02T 10/6239* (2013.01); *Y02T 10/6286* (2013.01); *Y02T 10/642* (2013.01); *Y02T 10/7005* (2013.01); *Y02T 10/705* (2013.01); *Y02T 10/7044* (2013.01); *Y02T 10/7258* (2013.01); *Y02T 10/7291* (2013.01); *Y02T 90/16* (2013.01); *Y02T 90/162* (2013.01)

(56) References Cited

U.S. PATENT DOCUMENTS

2008/0319597 A1 12/2008 Yamada
2010/0084211 A1* 4/2010 Seidel .................... B60K 6/48 180/294
2010/0305799 A1 12/2010 Yamada et al.
2011/0017529 A1* 1/2011 Durney .................. B60L 1/003 180/65.1
2011/0174561 A1* 7/2011 Bowman ................. B60K 6/46 180/65.245
2011/0246004 A1* 10/2011 Mineta .............. G01C 21/3469 701/22
2012/0032637 A1 2/2012 Kotooka et al.
2012/0197472 A1* 8/2012 He ........................ B60K 6/105 701/22
2012/0208672 A1* 8/2012 Sujan ................... B60W 10/02 477/5
2013/0015860 A1 1/2013 Crombez
2013/0066493 A1* 3/2013 Martin ................. B60W 20/00 701/22
2013/0096749 A1* 4/2013 Hussain ................. B60K 6/46 701/22
2013/0296102 A1 11/2013 Banker et al.
2015/0019057 A1 1/2015 Morisaki et al.
2016/0167641 A1 6/2016 Yoon
2017/0021820 A1 1/2017 Ogawa
2017/0021823 A1 1/2017 Ogawa
2017/0028980 A1 2/2017 Ogawa et al.
2017/0028981 A1 2/2017 Ogawa et al.
2017/0088117 A1 3/2017 Ogawa

FOREIGN PATENT DOCUMENTS

JP 2004-248455 A 9/2004
JP 2005-160269 A 6/2005
JP 2008-279803 A 11/2008
JP 2010-006216 A 1/2010
JP 2011006047 A 1/2011
JP 2013-119317 A 6/2013

* cited by examiner

<Modification of Embodiment>

HYBRID VEHICLE CONTROL APPARATUS

CROSS-REFERENCE TO RELATED APPLICATIONS

This application claims priority to Japanese Patent Application No. 2015-145351 filed on Jul. 22, 2015, the entire contents of which are hereby incorporated by reference.

BACKGROUND

Field

The present disclosure relates to a hybrid vehicle control apparatus a which includes both an internal combustion engine and a motor as drive sources of the vehicle.

Description of the Related Art

There has been known a hybrid vehicle (hereinafter also referred to as the "vehicle" for simplicity) which includes both an internal combustion engine (hereinafter also referred to as the "engine" for simplicity) and a motor as drive sources of the vehicle. Such a vehicle includes a storage battery which supplies electric power to the motor and which is charged by output of the engine.

In addition, when rotation of a wheel axle is transmitted to the motor, the motor generates electric power (i.e., an electric generator generates electric power), and the storage battery is charged by the electric power as well. Namely, the kinetic energy of the vehicle is converted to electrical energy, and the electrical energy is collected by the storage battery. This energy conversion is also called "regeneration." When regeneration is performed, the motor generates a force for braking the vehicle (torque for decreasing the speed of the vehicle). The braking force is also called "regenerative braking force."

The fuel efficiency (fuel consumption rate) of the vehicle can be improved by collecting, by means of regeneration during deceleration, a portion of energy consumed by the engine or the motor during acceleration or constant-speed travel of the vehicle, and storing the collected energy in the storage battery. During travel of the vehicle, the remaining capacity SOC (State of Charge) of the storage battery fluctuates.

Deterioration of the storage battery accelerates as a result of an increase in the remaining capacity SOC when the remaining capacity SOC is high and as a result of a decrease in the remaining capacity SOC when the remaining capacity SOC is low. Therefore, during travel of the vehicle, the control apparatus of the vehicle maintains the remaining capacity SOC at a level between a predetermined remaining capacity upper limit and a predetermined remaining capacity lower limit.

Incidentally, in the case where the vehicle travels in a downhill section, the vehicle continuously accelerates even when neither the engine nor the motor generates torque. Therefore, a driver of the vehicle removes his/her foot from the accelerator pedal and may press down on the brake pedal so as to request the vehicle to produce braking force. At that time, the vehicle restrains an increase in the vehicle speed by means of regenerative braking force and increases the remaining capacity SOC.

When the remaining capacity SOC increases; i.e., when the amount of electric power stored in the storage battery increases, the vehicle can travel over a longer distance by using the output of the motor only without operating the engine. Accordingly, if the remaining capacity SOC can be increased as much as possible within a range below the remaining capacity upper limit when the vehicle travels in a downhill section, the fuel efficiency of the vehicle can be improved further.

However, when the downhill section is long, the remaining capacity SOC reaches the remaining capacity upper limit, which makes it impossible to increase the remaining capacity SOC further. Accordingly, the greater the difference between the remaining capacity upper limit and the remaining capacity SOC at the start point of the downhill section, the greater the effect in improving fuel efficiency attained as a result of the travel in the downhill section.

In view of the foregoing, one conventional drive control apparatus (hereinafter also referred to as the "conventional apparatus") raises the remaining capacity upper limit and lowers the remaining capacity lower limit when a travel route contains a downhill section having a predetermined height difference. In addition, the conventional apparatus puts higher priority to travel by means of the motor than to travel by means of the engine such that the remaining capacity SOC approaches the "lowered remaining capacity lower limit" to the greatest extent possible before the vehicle enters the downhill section (see, for example, Japanese Patent Application Laid-Open (kokai) No. 2005-160269).

Incidentally, in general, when output power of an engine is low, the efficiency of the engine (the ratio of the power to fuel consumption) is low. Accordingly, when a vehicle starts to travel and travels at low speed, a control apparatus for a hybrid vehicle has the engine stop and has a motor generate power only.

For example, when a vehicle travels in a congestion section (a section where traffic congestion is taking place), the vehicle have to repeat travelling and stopping. Accordingly, when a vehicle travels in a congestion section, frequency of travelling by output power of a motor is increased, and then the remaining capacity SOC decreases.

Therefore, in case that the remaining capacity SOC is decreased in advance since travelling of a downhill section is expected, when traffic congestion occurs in the downhill section, the remaining capacity SOC cannot be increased by the regenerative braking force. As a result, the remaining capacity SOC remains low, and then fuel efficiency decreases because of necessity to increase the remaining capacity SOC by output power of an engine.

SUMMARY

One object of the present disclosure is to provide a hybrid vehicle control apparatus which can avoid a state that the remaining capacity SOC cannot be increased by the regenerative braking, when traffic congestion occurs in the downhill section, because of a lack of opportunity to perform the regenerative braking after the remaining capacity SOC is decreased.

A hybrid vehicle control apparatus according to the present disclosure for achieving the above-described object (hereinafter also referred to as the "present disclosure apparatus") is applied to a hybrid vehicle which includes an internal combustion engine and a motor as drive sources of the vehicle, includes a storage battery for supplying electric power to the motor, and is configured to perform regenerative braking by using the motor, and charge the storage battery with electric power generated as a result of the regenerative braking and electric power generated by using output of the internal combustion engine.

The remaining capacity of the storage battery is a value which represent the amount of electric power charged in the storage battery. For example, when the remaining capacity is less than a target remaining capacity, the present disclosure apparatus has the engine generate more output power so as to increase electric power which the motor generates and increase the remaining capacity than that in the case where the remaining capacity is equal to the target remaining capacity. Alternatively, when the remaining capacity is more than the target remaining capacity, the present disclosure apparatus has the engine generate less output power or the engine stop so as to increase output power of the motor and decrease the remaining capacity than that in the case where the remaining capacity is equal to the target remaining capacity.

The present disclosure apparatus comprises a control portion which controls the internal combustion engine in such a manner that the storage battery is charged and the remaining capacity of the storage battery approaches a predetermined target remaining capacity. Additionally, the control portion obtains a planned travel route of the vehicle.

In the case where a target downhill section is contained in the planned travel route, the control portion executes "downhill control" when the vehicle travels in "a particular section" of a section which extends to "the end point of the target downhill section" from "a downhill control start point which is shifted back from the start point of the target downhill section by a predetermined distance." The particular section contains at least a section extending from the downhill control start point to the start point of the target downhill section. The downhill control changes the target remaining capacity to a remaining capacity smaller as compared with the case where the vehicle travels in sections other than the particular section.

Additionally, the control portion obtains traffic congestion information which represent a "congestion section", and when the target downhill section contains one or more congestion sections and the total distance of the congestion sections contained in the target downhill section is greater than a predetermined distance threshold, the control portion execute a "specific control" which prohibits execution of the downhill control.

Accordingly, although the target downhill section is contained in the planned travel route, when a traffic congestion section which occurs in the target downhill section is longer than the distance threshold, the present disclosure apparatus determines that it is difficult to increase the remaining capacity SOC utilizing the target downhill section. Therefore, the present disclosure apparatus can decrease the possibility that the remaining capacity SOC cannot be increased by the regenerative braking because of a lack of opportunity to perform the regenerative braking after the remaining capacity SOC is decreased.

In one mode of the present disclosure apparatus, the distance threshold is configured on the basis of a value which is proportional to the distance of the target downhill section containing the congestion section by the control portion.

For example, in the case where the distance of the target downhill section is very long, even if the total distance of the congestion sections is long to some extent, the remaining capacity SOC can be increased. Accordingly, the present mode can decrease the possibility that "a wrong decision that it is difficult to increase the remaining capacity SOC" is made on the basis of comparing the total distance of the congestion sections to a distance threshold which is a fixed value although the ratio of the distance of the congestion section to the distance of the target downhill section is low.

DETAILED DESCRIPTION

Figure 1:
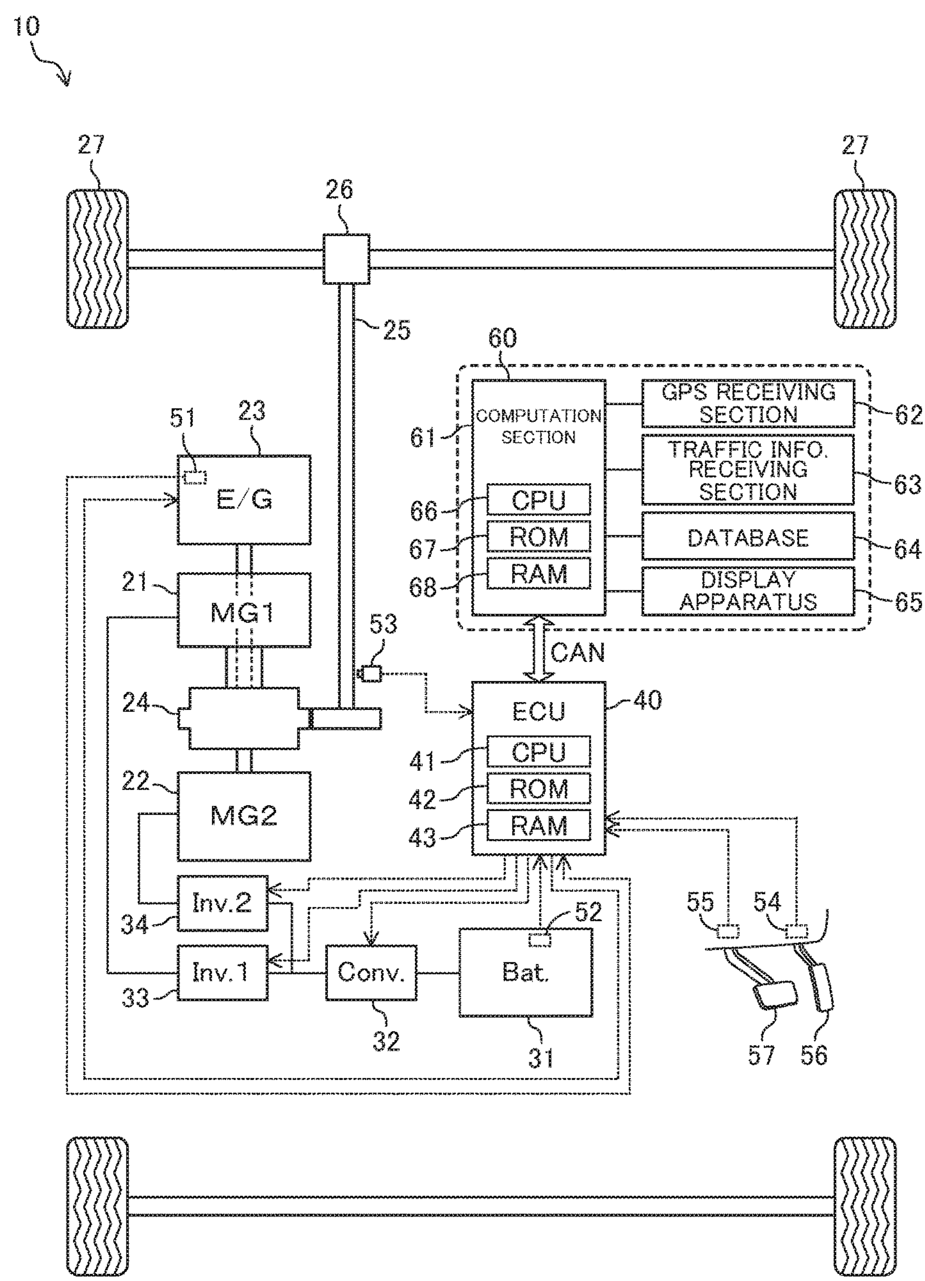
FIG. 1 is a schematic illustration of a vehicle (present vehicle) to which a hybrid vehicle control apparatus (present control apparatus) according to an embodiment of the present disclosure is applied.

Hybrid vehicle control apparatuses according to an embodiment of the present disclosure (hereinafter also referred to as the "present control apparatus") will now be described with reference to the drawings. FIG. 1 is a schematic illustration of a vehicle 10 to which the present control apparatus is applied. The vehicle 10 includes a first motor 21, a second motor 22, and an engine 23. Namely, the vehicle 10 is a hybrid vehicle.

The vehicle 10 further includes a power split mechanism 24, a storage battery 31, a step-up converter 32, a first inverter 33, a second inverter 34, an ECU (Electric Control Unit) 40, and a travel assisting apparatus 60. The ECU 40 and the travel assisting apparatus 60 constitute the present control apparatus.

Each of the first motor 21 and the second motor 22 includes a stator having three-phase windings (coils) which generate rotating magnetic fields and a rotor having permanent magnets which generate torque by magnetic force between the rotating magnetic fields and the permanent magnets. Each of the first motor 21 and the second motor 22 functions as a generator and a motor.

The first motor 21 is mainly used as a generator. The first motor 21 also cranks the engine 23 when the engine 23 is to be started. The second motor 22 is mainly used as a motor and can generate vehicle drive force (torque for causing the vehicle to travel) for the vehicle 10. The engine 23 can also generate vehicle drive force for the vehicle 10. The engine 23 is a four-cylinder, four-cycle gasoline engine.

The power split mechanism 24 is a planetary gear mechanism. The power split mechanism 24 includes a ring gear, a plurality of power split planetary gears, a plurality of reduction planetary gears, a first sun gear, a second sun gear, a first planetary carrier, and a second planetary carrier (all the components are not shown).

Each of the power split planetary gears and the reduction planetary gears is in meshing engagement with the ring gear. The first sun gear is in meshing engagement with the power split planetary gears. The second sun gear is in meshing engagement with the reduction planetary gears. The first planetary carrier holds the plurality of power split planetary gears in such a manner that the power split planetary gears can rotate about their axes, respectively, and the power split planetary gears can revolve around the first sun gear. The second planetary carrier holds the plurality of reduction planetary gears in such a manner that the reduction planetary gears can rotate about their axes, respectively.

The ring gear is connected to an axle 25 through a counter gear disposed on the outer periphery of the ring gear in such a manner that torque can be transmitted from the ring gear to the axle 25. The output shaft of the engine 23 is coupled to the first planetary carrier in such a manner that torque can be transmitted from the output shaft of the engine 23 to the first planetary carrier. The output shaft of the first motor 21 is coupled to the first sun gear in such a manner that torque can be transmitted from the output shaft of the first motor 21 to the first sun gear. The output shaft of the second motor 22 is coupled to the second sun gear in such a manner that torque can be transmitted from the output shaft of the second motor 22 to the second sun gear.

Figure 2:
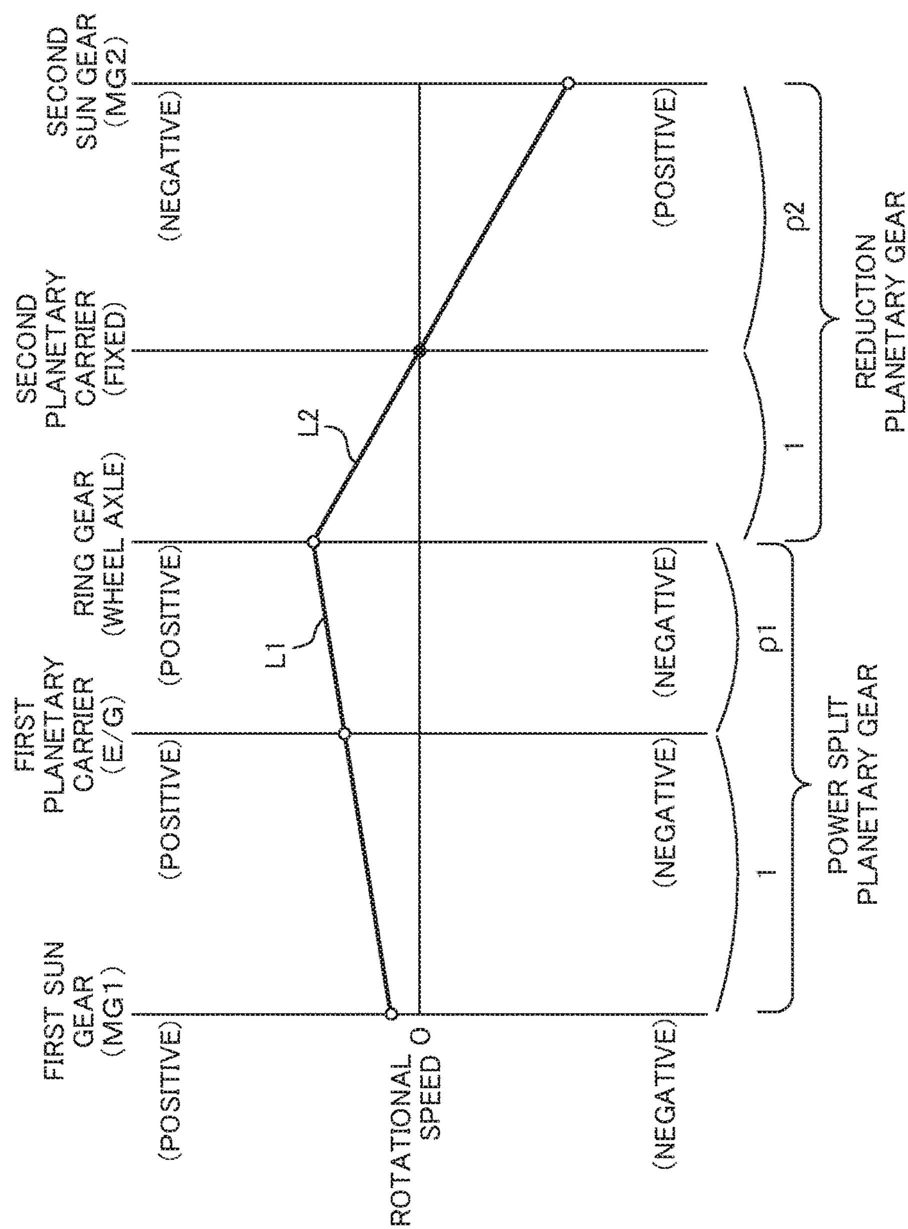
FIG. 2 is an alignment chart which represents the relation among rotational speeds of a first motor, a second motor, an engine, and a ring gear.

The relation among the rotational speed (MG1 rotational speed) Nm1 of the first motor 21, the engine rotational speed NE of the engine 23, and the ring gear rotational speed Nr of the power split mechanism 24, and the relation between the rotational speed (MG2 rotational speed) Nm2 of the second motor 22 and the ring gear rotational speed Nr are represented by a well-known alignment chart shown in FIG. 2. The two straight lines shown in the alignment chart will be also referred to as an operation collinear line L1 and an operation collinear line L2.

According to the operation collinear line L1, the relation between the MG1 rotational speed Nm1, and the engine rotational speed NE and the ring gear rotational speed Nr can be represented by the following expression (1). The gear ratio ρ1 in the expression (1) is the ratio of the number of the teeth of the first sun gear to the number of the teeth of the ring gear (namely, ρ1=the number of the teeth of the first sun gear/the number of the teeth of the ring gear).

$$Nm1=Nr-(Nr-NE)\times(1+\rho1)/\rho1 \quad (1)$$

Meanwhile, according to the operation collinear line L2, the relation between the MG2 rotational speed Nm2 and the ring gear rotational speed Nr can be represented by the following expression (2). The gear ratio ρ2 in the expression (2) is the ratio of the number of the teeth of the second sun gear to the number of the teeth of the ring gear (namely, ρ2=the number of the teeth of the second sun gear/the number of the teeth of the ring gear).

$$Nm2=Nr\times(1+\rho2)/\rho2-Nr \quad (2)$$

Referring back to FIG. 1, the axle 25 is coupled to drive wheels 27 through a differential gear 26 in such a manner that torque can be transmitted from the axle 25 to the drive wheels 27.

The storage battery 31 is a secondary battery (lithium ion battery in the present embodiment) which can be charged and discharged. DC electric power output from the storage battery 31 undergoes voltage conversion (step-up) performed by the step-up converter 32 and becomes high-voltage electric power. The first inverter 33 converts the high-voltage electric power to AC electric power and supplies the AC electric power to the first motor 21. Similarly, the second inverter 34 converts the high-voltage electric power to AC electric power and supplies the AC electric power to the second motor 22.

Meanwhile, when the first motor 21 operates as a generator, the first inverter 33 converts the generated AC electric power to DC electric power and supplies the DC electric power to the step-up converter 32 and/or the second inverter 34. Similarly, when the second motor 22 operates as a generator, the second inverter 34 converts the generated AC electric power to DC electric power and supplies the DC electric power to the step-up converter 32 and/or the first inverter 33. The step-up converter 32 steps down the DC electric power supplied from the first inverter 33 and/or the second inverter 34 and supplies the stepped down DC electric power to the storage battery 31. As a result, the storage battery 31 is charged.

The ECU 40 is a microcomputer which includes a CPU 41, a ROM 42 for storing programs to be executed by the CPU 41, lookup tables (maps), etc., a RAM 43 for temporarily storing data, and other necessary components. The ECU 40 controls the engine 23, the step-up converter 32, the first inverter 33, and the second inverter 34.

The ECU 40 is connected to a crank angle sensor 51, an ammeter 52, a vehicle speed sensor 53, an accelerator operation amount sensor 54, and a brake operation amount sensor 55.

The crank angle sensor 51 measures the rotational position of the crankshaft of the engine 23 and outputs a signal which represents its crank angle CA. The ECU 40 calculates the engine rotational speed NE of the engine 23 on the basis of the crank angle CA. The ammeter 52 outputs a signal which represents current IB flowing through the storage battery 31. The ECU 40 calculates a remaining capacity SOC, which is the amount of electric power charged in the storage battery 31, on the basis of the current IB.

The vehicle speed sensor 53 detects the rotational speed of the axle 25 and outputs a signal which represents the travel speed (vehicle speed) Vs of the vehicle 10. The accelerator operation amount sensor 54 outputs a signal which represents the operation amount (accelerator operation amount) Ap of an accelerator pedal 56. The brake operation amount sensor 55 outputs a signal which represents the operation amount (brake operation amount) Bp of a brake pedal 57.

The travel assisting apparatus 60 includes a computation section 61, a GPS receiving section 62, a traffic information receiving section 63, a database 64, and a display apparatus 65. The GPS receiving section 62 obtains the present position Pn of the vehicle 10 on the basis of signals (radio waves) from GPS (Global Positioning System) satellites and outputs a signal representing the present position Pn to the computation section 61.

The traffic information receiving section 63 receives traffic congestion information overlapped on FM multiplexing broadcasting from a road traffic information communication system (VICS for abbreviation) and beacon apparatus of VICS (not shown).

The database 64 is formed by a hard disk drive (HDD) and stores a map database. The map database includes information (map information) regarding "nodes" such as intersections, dead ends, etc., "links" which connect the nodes, and "facilities" such as buildings, parking lots, etc. located along the links. Further, the map database includes pieces of information provided for each link; i.e., the distance of a section (road), the positions of nodes specifying one end (start position) and the other end (end position) of each link, and the average gradient of each link (the ratio of the height difference between the opposite ends of the link to the distance between the opposite ends of the link).

The display apparatus 65 is disposed on a center console (not shown) provided within the compartment of the vehicle 10. The display apparatus 65 has a display and can display the map information stored in the map database, together with the present position Pn, in response to an operation by a driver of the vehicle 10.

The display of the display apparatus 65 also operates as a touch panel. Accordingly, the driver can operate the travel assisting apparatus 60 by touching the display of the display apparatus 65. Further, the display apparatus 65 includes a sound generation unit (not shown). The display apparatus 65 can perform reproduction of a warning beep and announce a message, etc., in accordance with instructions from the computation section 61.

The computation section 61 is a microcomputer which includes a CPU 66, a ROM 67 for storing programs to be executed by the CPU 66, lookup tables (maps), etc., a RAM 68 for temporarily storing data, and other necessary components. The computation section 61 can exchange information with the ECU 40 through a CAN (Controller Area Network). The computation section 61 will be also referred to as the "travel assisting ECU," and the ECU 40 will be also referred to as the "vehicle control ECU."

When the driver of the vehicle 10 enters a destination by using the display apparatus 65, the computation section 61 searches a route (planned travel route) from the present position Pn to the destination on the basis of the map database. The planned travel route is defined by a group of links. The computation section 61 provides a route guidance by using displays on the display apparatus 65 and sounds generated from the sound generation unit such that the driver can pass through the planned travel route.

(Control of Generated Torque by ECU)

Next, operation of the ECU 40 will be described.

When the driver demands the vehicle 10 to generate a drive force (torque), the driver performs an operation for increasing the accelerator operation amount Ap. The ECU 40 determines a demanded ring gear torque Tr*, which is a target value of the torque (ring gear generation torque) Tr acting on the ring gear, on the basis of the accelerator operation amount Ap and the vehicle speed Vs. Since the ring gear generation torque Tr is in proportion to the torque acting on the drive wheels 27, the torque acting on the drive wheels 27 increases as the ring gear generation torque Tr increases.

The ECU 40 controls the engine 23, the step-up converter 32, the first inverter 33, and the second inverter 34 such that the ring gear generation torque Tr becomes equal to the demanded ring gear torque Tr* and the remaining capacity SOC coincides with (approaches) a target remaining capacity SOC*.

For example, in the case where the remaining capacity SOC approximately coincides with the target remaining capacity SOC*, in an operation region within which the operation efficiency of the engine 23 is high, the ECU 40 causes both the engine 23 and the second motor 22 to generate outputs, and causes the first motor 21 to generate electric power by using a portion of the engine output Pe (the output of the engine 23). In this case, the electric power generated by the first motor 21 is supplied to the second motor 22. Accordingly, the remaining capacity SOC is maintained at the target remaining capacity SOC*.

In the case where the remaining capacity SOC is lower than the target remaining capacity SOC*, the ECU 40 increases the engine output Pe to thereby increase the amount of electric power generated by the first motor 21. As a result, the remaining capacity SOC increases.

Meanwhile, when the engine 23 is in an operation region within which the operation efficiency of the engine 23 is low (for example, at the time of start of the vehicle 10 and at the time of low-load travel), the ECU 40 stops the operation of the engine 23 and causes the second motor 22 only to generate an output. In this case, the remaining capacity SOC decreases. However, when the remaining capacity SOC is less than a remaining capacity lower limit Smin, the ECU 40 executes "forced charging" by operating the engine 23 and causing the first motor 21 to generate electric power. As a result, the remaining capacity SOC becomes greater than the remaining capacity lower limit Smin.

In the case where the remaining capacity SOC is greater than a remaining capacity upper limit Smax, even when the engine 23 is in the operation region within which the operation efficiency of the engine 23 is high, the ECU 40 stops the operation of the engine 23 except the case where a large output and a large torque are demanded, and causes the second motor 22 only to generate an output. As a result, the remaining capacity SOC becomes less than the remaining capacity upper limit Smax.

(Control of Braking Force by ECU)

When the driver demands the vehicle 10 to generate a braking force, the driver performs an operation for setting both the accelerator operation amount Ap and the brake operation amount Bp to "0" or an operation for increasing the brake operation amount Bp after setting the accelerator operation amount Ap to "0." When the generation of a braking force is demanded, the ECU 40 generates a regenerative braking force and a frictional braking force. At that time, the regenerative braking force is supplemented by the frictional braking force to generate the demanded braking force.

When the regenerative braking force is to be generated, the ECU 40 causes the first motor 21 and/or the second motor 22 to generate electric power. In other words, the ECU 40 converts the kinetic energy of the vehicle 10 to electrical energy through use of the first motor 21 and/or the second motor 22. The generated electric power is charged in the storage battery 31, whereby the remaining capacity SOC increases.

When the frictional braking force is to be generated, the ECU 40 requests a brake apparatus (not shown) to apply frictional forces to brake discs provided on the wheels of the vehicle 10, including the drive wheels 27. In other words, the ECU 40 converts the kinetic energy of the vehicle 10 to thermal energy through use of the brake apparatus.

The ECU 40 controls the first motor 21, the second motor 22, and the brake apparatus such that the total braking force, which is the sum of the regenerative braking force and the frictional braking force, becomes equal to the braking force demanded by the driver.

(Downhill Control)

In the case where the vehicle 10 travels in a downhill section, if the vehicle 10 generates no braking force, the vehicle speed Vs increases even when no torque is transmitted to the drive wheels 27. When the vehicle speed Vs becomes higher than a speed which the driver expects, the driver demands a braking force. The entirety or a portion of the demanded braking force is provided by the regenerative braking force. Therefore, during the travel in the downhill section, the frequency at which the first motor 21 and/or the second motor 22 generates electric power increases, whereby the remaining capacity SOC increases. In other words, the ECU 40 converts the potential energy of the vehicle 10 to kinetic energy and then to electrical energy.

When the remaining capacity SOC increases, the frequency at which the engine 23 is operated to charge the storage battery 31 decreases, and a portion of the output of the engine 23, which portion is used for charging the storage battery 31, decreases. Therefore, the fuel efficiency of the vehicle 10 improves. However, when the remaining capacity SOC reaches the remaining capacity upper limit Smax in the middle of the downhill section, it becomes impossible to increase the remaining capacity SOC more and improve the fuel efficiency more.

Figure 3:
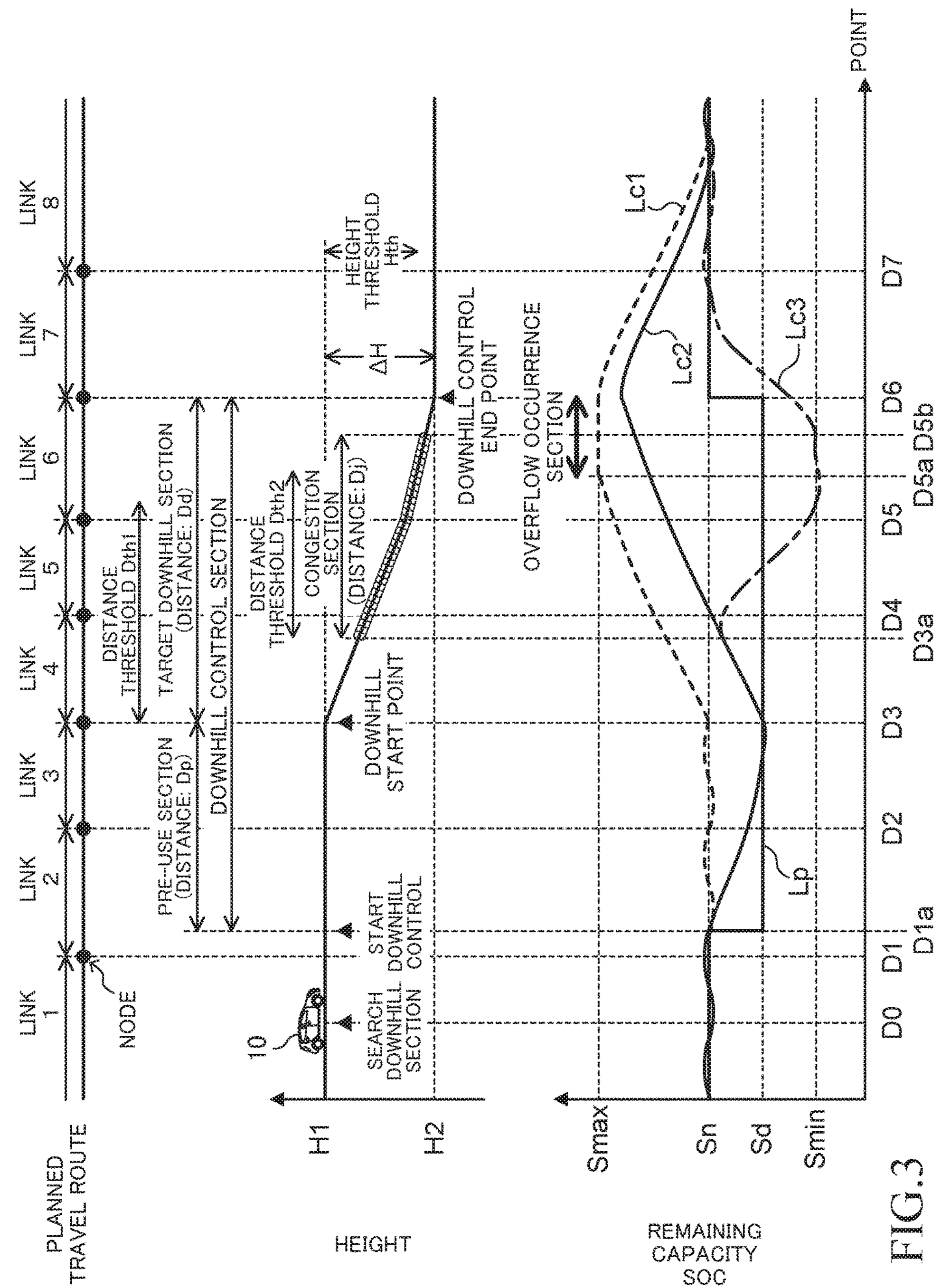
FIG. 3 is a graph which shows a change in remaining capacity when the present vehicle travels through a target downhill section.

A change in the remaining capacity SOC at the time when the vehicle 10 travels through a downhill section will be described with reference to FIG. 3. In FIG. 3, the links defining or constituting a planned travel route of the vehicle 10 are denoted as link 1 to link 8 for convenience' sake. The present position Pn is located on link 1. Link 4 to link 6 correspond to a target downhill section which will be described later. Meanwhile, link 1 to link 3, link 7, and link 8 correspond to flat roads. When the downhill control to be described later is not executed, the target remaining capacity SOC* is set to a standard remaining capacity Sn.

A curved line Lc1 (broken line) shows a change in the remaining capacity SOC at the time when the vehicle 10 travels from link 1 to link 8 without executing the downhill control. When the vehicle 10 travels through link 1 to link 3, the operations of the engine 23, the first motor 21, and the second motor 22 are controlled such that the remaining capacity SOC approaches the standard remaining capacity Sn which is the target remaining capacity SOC*. Therefore, the remaining capacity SOC fluctuates near the standard remaining capacity Sn. When the vehicle 10 enters a section corresponding to link 4, the remaining capacity SOC starts to increase due to regenerative braking, and when the vehicle 10 reaches a point D5*a* which is located midway of link 6, the remaining capacity SOC reaches the remaining capacity upper limit Smax.

Therefore, when the vehicle 10 travels between point D5*a* and point D6, despite the fact that the vehicle 10 travels in a downhill section, the vehicle 10 cannot perform regenerative braking. Therefore, the remaining capacity SOC cannot be increased (namely, overflow occurs), and the fuel efficiency improving effect is not attained sufficiently. In addition, if the time over which the remaining capacity SOC is maintained at a level near the remaining capacity upper limit Smax becomes long, deterioration of the storage battery 31 is accelerated.

In view of this, before the downhill section, the ECU 40 of the vehicle 10 executes "downhill control" of decreasing the target remaining capacity SOC* by a predetermined amount (electric power amount S10). When the downhill control is executed, the target remaining capacity SOC* is set to a remaining capacity (low-side remaining capacity) Sd. In the present embodiment, the magnitude of the difference between the standard remaining capacity Sn and the low-side remaining capacity Sd is equal to the electric power amount S10 which corresponds to 10% the maximum charge amount of the storage battery 31 (namely, the amount of stored electric power at the time when the remaining capacity SOC is 100%) (namely, Sd=Sn−S10).

The downhill control is started when the vehicle 10 reaches a point D1*a* which is shifted back (toward the start point of the planed travel route) from the start point D3 of the downhill section by a predetermined pre-use distance Dp. Meanwhile, the downhill control is ended when the vehicle 10 reaches the end point D6 of the downhill section, and the target remaining capacity SOC* is changed from the low-side remaining capacity Sd to the standard remaining capacity Sn. A change in the target remaining capacity SOC* in the case where the downhill control is executed is shown by a polygonal line Lp.

A section composed of the downhill section and the "pre-use section" (between the point shifted back from the start point D3 of the downhill section by the predetermined pre-use distance Dp and the start point of the downhill section) will be also referred to as the "downhill control section." The pre-use distance Dp is a distance set in advance and is sufficiently large so that when the vehicle 10 travels over that distance, the remaining capacity SOC is gradually decreased by the electric power amount S10. The point shifted back from the start point of the downhill section by the predetermined pre-use distance Dp is also referred to as a "downhill control start point", for convenience.

A change in the remaining capacity SOC in the case where the downhill control is executed is shown by a curved line Lc2 (continuous line). As can be understood from the curved line Lc2, when the target remaining capacity SOC* is set to the low-side remaining capacity Sd at point D1*a*, the remaining capacity SOC decreases and reaches a level near the low-side remaining capacity Sd. When the vehicle 10 travels through the downhill section after that, the remaining capacity SOC increases. However, the vehicle 10 ends the travel through the downhill section before the remaining capacity SOC reaches the remaining capacity upper limit Smax. Namely, as a result of the downhill control, occurrence of the above-described overflow can be avoided.

When the vehicle 10 reaches the start point of the downhill control section (point D1*a*), the ECU 40 receives a notice which indicates that the downhill control must be started, from the travel assisting apparatus 60 (specifically, the computation section 61). The processing which the computation section 61 executes will be described later. Similarly, the vehicle 10 reaches the end point of the downhill control section (point D6), ECU 40 receives a notice which indicates that the downhill control must be stopped, from the computation section 61. The ECU 40 starts the downhill control, and then stops the downhill control, according to the notices receiving from the computation section 61.

(Provision of Information from Travel Assisting Apparatus to ECU)

The computation section 61 searches target downhill sections contained in a route from the present position Pn to a destination (namely, a planned travel route). In the case where a target downhill section is found, when the vehicle 10 reaches the start point of the downhill control section (the start point of the pre-use section), the computation section 61 sends to the ECU 40 a notice which indicates that the downhill control must be started. In addition, when the vehicle 10 reaches the end point of the downhill control section (the end point of the target downhill section), the computation section 61 sends to the ECU 40 a notice which indicates that the downhill control must be stopped.

The downhill section which is the target of the downhill control (target downhill section) is a downhill section in which an increase in the remaining capacity SOC due to the above-described conversion of potential energy to electrical energy is expected to become greater than an "electric power amount S20 corresponding to 20% the maximum charge amount of the storage battery 31." In the present embodiment, target downhill section is a downhill section where a distance between the start point and the end point is greater than a distance threshold Dth1, and where the height of the end point is lower than the height of the start point and the height difference is greater than a height difference threshold Hth.

In the example of FIG. 3, the distance of a downhill section constituted by link 4 to link 6 (namely, a section from point D3 to point D6) is Dd and the distance Dd is greater than the distance threshold Dth1 (namely, Dd>Dth1). In addition, the height of the start point of the downhill section (namely, the start point D3 of link 4) is H1, the height of the end point (namely, the end point D6 of link 6) is H2 and the height deference ΔH between H1 and H2 is greater than the height threshold Hth (namely, ΔH=H1−H2>Hth). Accordingly, the downhill section constituted by link 4 to link 6 is therefore a target downhill section.

Notably, as described above, the length and gradient of each link are stored in the map database. Therefore, the computation section 61 obtains the height difference between one end and the other end of each link by calculating the product of the length and gradient of the link. Further, the computation section 61 obtains the height difference between one end and the other end of a certain section by calculating the sum of the height differences of a plurality of links which constitute the certain section. Notably, in the case where the map database contains the heights of opposite ends of each link, the height difference of each link is obtained by subtracting the height of the start point of the link from the height of the end point of the link.

(Specific Control)

Incidentally, when a traffic congestion occurs in the target downhill section, the above-described conversion from the potential energy of the vehicle 10 to electrical energy cannot be executed sufficiently. Accordingly, the remaining capacity SOC cannot be increased. More specifically, when the vehicle 10 travels in a congestion section, the vehicle speed Vs becomes lower as compared with the case where the congestion does not occur. Alternatively, when the vehicle 10 travels in a congestion section, stopped states (states where Vs=0) and running states (states where Vs>0) alternately occur.

As described above, at the time of start of the vehicle 10 and at the time of low-load travel, the ECU 40 stops the operation of the engine 23 and causes the second motor 22 only to generate an output. Meanwhile, during traveling a congestion section, although the vehicle 10 decelerates and stops frequently (namely, regenerative braking is performed frequently), since the vehicle speed Vs at the time of start of regenerative braking is low, the amount of electric power obtained by the regenerative braking becomes low. Therefore, when the vehicle 10 travels in a congestion section, even if the congestion section is in a downhill section, the remaining capacity SOC decreases.

In the example of FIG. 3, a change in the remaining capacity SOC in the case where a traffic congestion occurs between point D3*a* and point D5*b* is shown by a curved line Lc3 (dot-and-dash line). As can be understood from the curved line Lc3, when the vehicle 10 enters the congestion section, the remaining capacity SOC starts to decrease. And then, the remaining capacity SOC reaches a level near the remaining capacity lower limit Smin.

In the case where the remaining capacity SOC decreases and reaches a level near the low-side remaining capacity Sd as a result of the downhill control, when the vehicle 10 starts to travel of the congestion section, the time until the remaining capacity SOC reaches the remaining capacity lower limit Smin become shorter, as compared with the case where the vehicle 10 starts to travel of the congestion section with the remaining capacity SOC equal to the standard remaining capacity Sn. As described above, when the remaining capacity SOC reaches the remaining capacity lower limit Smin, since charge of the storage battery 31 by output of the engine 23 is started, the fuel efficiency of the vehicle 10 deteriorates. Meanwhile, if the downhill control is not executed, there is a possibility that the vehicle 10 gets through with travelling of the congestion section before the remaining capacity SOC reaches the remaining capacity lower limit Smin. In this case, the deterioration of the efficiency can be avoided.

In view of this, even if a target downhill section is contained in the planned travel route, when the distance of a congestion section contained in the target downhill section is greater than a distance threshold Dth2, the ECU 40 does not executes the downhill control. The processing which prohibits the computation section 61 from executing the downhill control is also referred to as a "specific control", for convenience. Specifically, in case of executing the specific control, the computation section 61 does not send the notice which indicates that the downhill control must be started when the vehicle reaches the start point of the downhill control section. Similarly, in case of executing the specific control, the computation section 61 does not send the notice which indicates that the downhill control must be stopped when the vehicle reaches the end point of the downhill control section.

In the case where a plurality of congestion sections in the target downhill section is present, when the total distance of each of the congestion sections is greater than the distance threshold Dth2, the downhill control is not executed. Namely, the computation section 61 does not notify the ECU 40 of reaching the start point and the end point of the downhill control section.

The distance threshold Dth2 is a distance in which a decrease in the remaining capacity SOC is expected to become equal to the electric power amount S10 as a result of increasing of the opportunities where the ECU 40 stops the operation of the engine 23 and causes the second motor 22 only to generate an output because of increasing of the opportunities of low-load travel during traveling in a congestion section. In the example of FIG. 3, since the congestion section distance Dj is greater than the distance threshold Dth2 (namely, Dj>Dth2), the downhill control is not executed.

(Specific Operation—Control of Drive Force by ECU)

Next, specific operation of the ECU 40 will be described.

Figure 4:
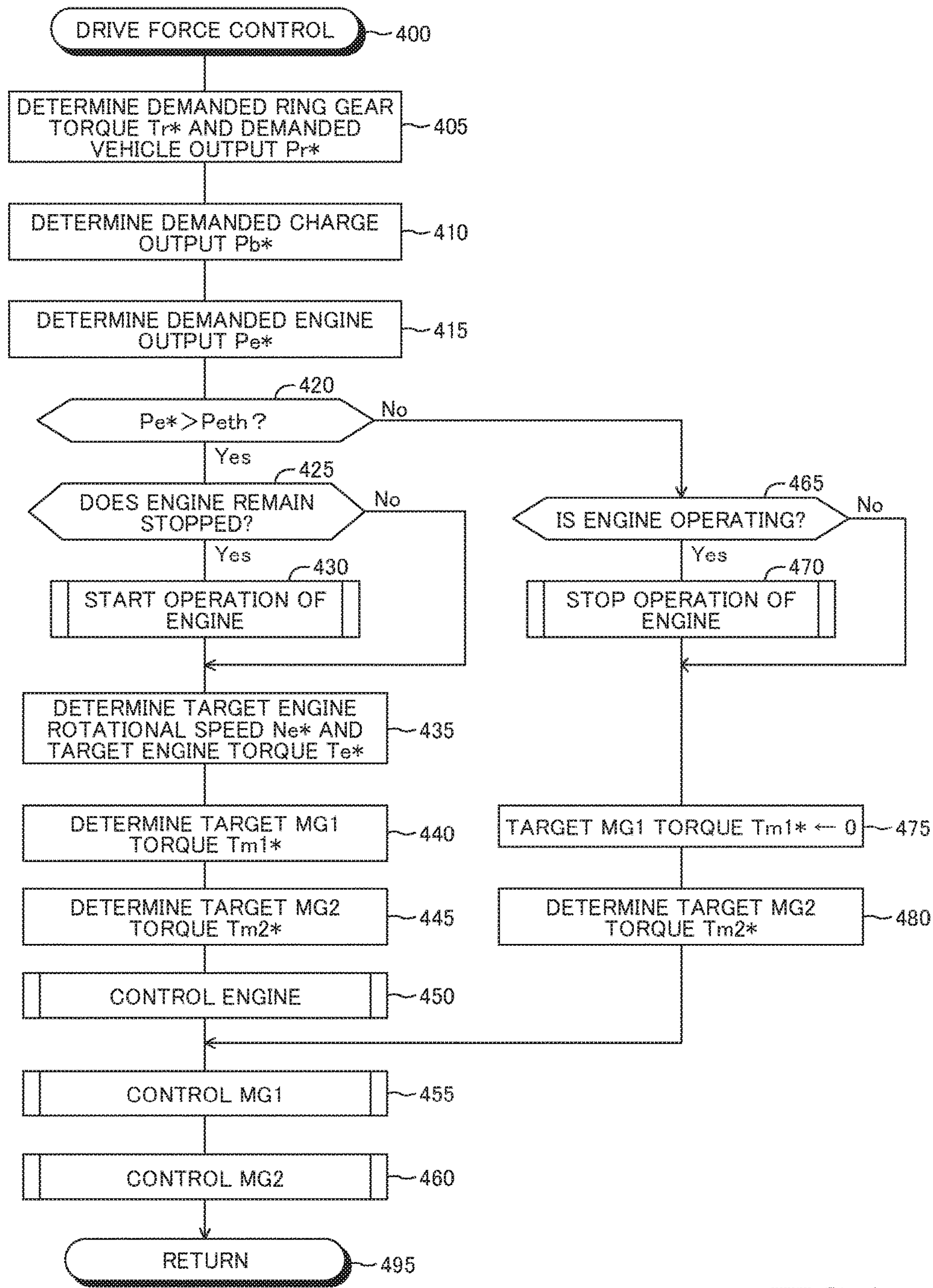
FIG. 4 is a flowchart showing drive force control processing executed by the present control apparatus.

The CPU 41 of the ECU 40 (hereinafter also referred to as the "CPU" for simplicity) executes the "drive force control routine" represented by the flowchart of FIG. 4 every time a predetermined period of time elapses. Accordingly, when a proper timing comes, the CPU starts the processing from step 400 of FIG. 4, successively performs the processings of step 405 to step 415 which will be described later, and proceeds to step 420.

Figure 5:
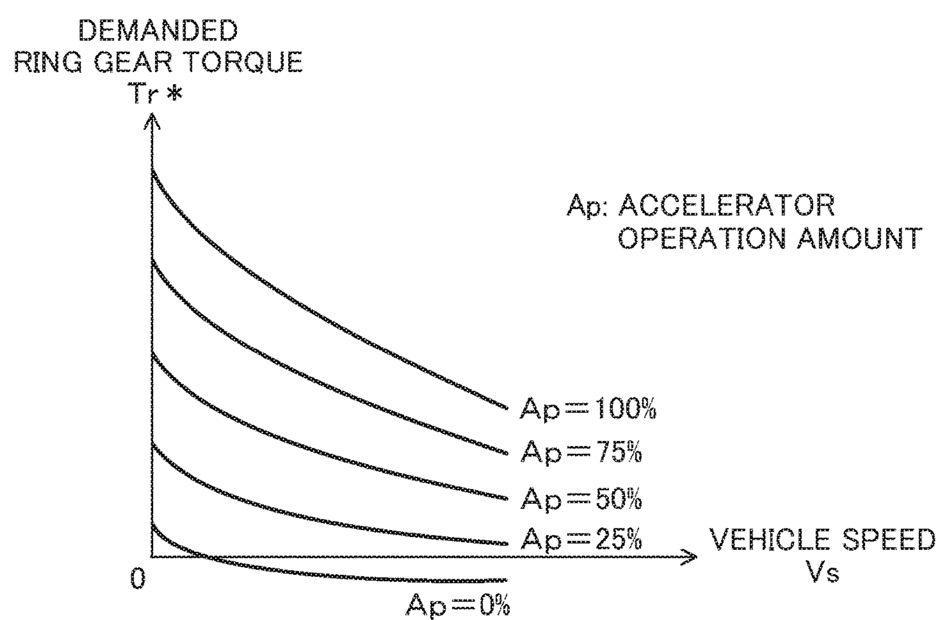
FIG. 5 is a graph showing the relation between vehicle speed and accelerator operation amount, and demanded ring gear torque.

Step 405: The CPU determines a demanded ring gear torque Tr* by applying the accelerator operation amount Ap and the vehicle speed Vs to a "lookup table which defines the relation between the accelerator operation amount Ap and the vehicle speed Vs, and the demanded ring gear torque Tr*" shown in FIG. 5, which is stored in the ROM 42 in a form of a lookup table. The demanded ring gear torque Tr* is proportional to the torque acting on the drive wheels 27 which the driver requests the vehicle 10 to produce.

Further, the CPU calculates, as a demanded vehicle output Pr*, the product of the demanded ring gear torque Tr* and the ring gear rotational speed Nr (Pr*=Tr*×Nr). The ring gear rotational speed Nr is proportional to the vehicle speed Vs.

Step 410: The CPU determines a demanded charge output Pb* on the basis of a remaining capacity difference ΔSOC which is the difference between the target remaining capacity SOC* and the actual remaining capacity SOC calculated separately (i.e., ΔSOC=SOC−SOC*). More specifically, the CPU determines the demanded charge output Pb* by applying the remaining capacity difference ΔSOC to a "lookup table which defines the relation between the remaining capacity difference ΔSOC and the demanded charge output Pb*" shown in FIG. 6, which is stored in the ROM 42 in a form of a lookup table.

Figure 6:
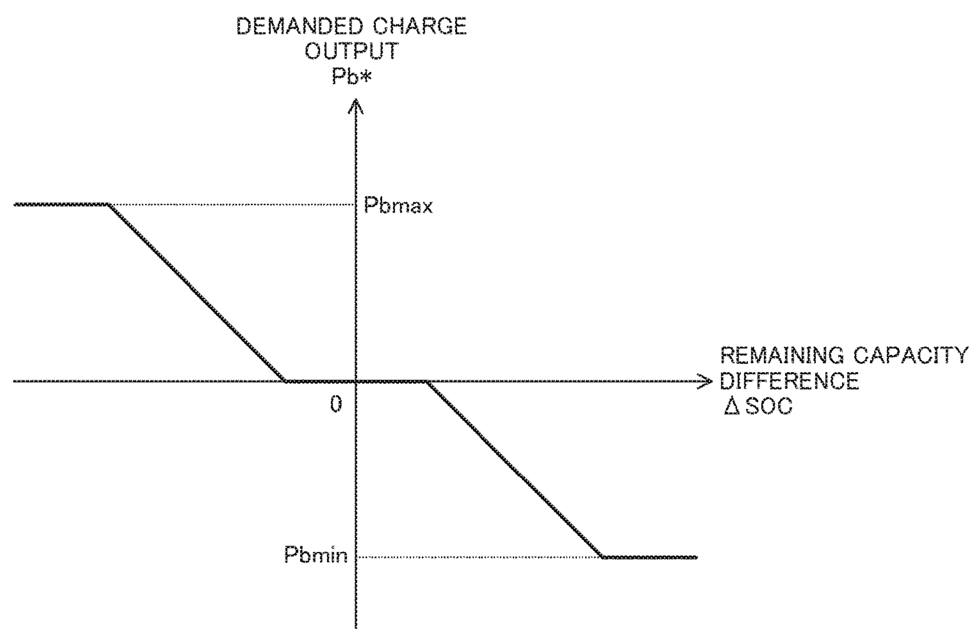
FIG. 6 is a graph showing the relation between remaining capacity difference and demanded charge output.

As can be understood from FIG. 6, the greater the remaining capacity difference ΔSOC, the smaller the value to which the demanded charge output Pb* is set. Accordingly, in the case where the actual remaining capacity SOC is at a certain level, when the target remaining capacity SOC* is decreased, the remaining capacity difference ΔSOC increases, whereby the demanded charge output Pb* decreases. The upper limit of the demanded charge output Pb* is Pbmax (Pbmax>0), and the lower limit of the set demanded charge output Pb* is Pbmin (Pbmin<0). Notably, irrespective of whether or not the downhill control is executed and irrespective of the value of the remaining capacity difference ΔSOC, the demanded charge output Pb* is set to the lower limit Pbmin when the remaining capacity SOC is equal to or greater than the remaining capacity upper limit Smax, and the demanded charge output Pb* is set to the upper limit Pbmax when the remaining capacity SOC is equal to or less than the remaining capacity lower limit Smin.

Step 415: The CPU calculates a demanded engine output Pe* by adding a loss Ploss to the sum of the demanded vehicle output Pr* and the demanded charge output Pb* (i.e., Pe*=Pr*+Pb*+Ploss).

Next, the CPU proceeds to step 420 and judges whether or not the demanded engine output Pe* is greater than an output threshold Peth. The output threshold Peth is set to a value determined such that when the engine 23 is operated to produce an output equal to or less than the output threshold Peth, the operation efficiency of the engine 23 becomes lower than a predetermined efficiency. In addition, the output threshold Peth is set such that when the demanded charge output Pb* is set to the upper limit Pbmax, the demanded engine output Pe* becomes greater than the output threshold Peth.

(Case 1: Pe*>Peth)

In the case where the demanded engine output Pe* is greater than the output threshold Peth, the CPU makes an affirmative judgment (Yes) in step 420 and proceeds to step 425. In step 425, the CPU judges whether or not the engine 23 is in a stopped state at the present. In the case where the engine 23 is in the stopped state, the CPU makes an affirmative judgment (Yes) in step 425 and proceeds to step 430. In step 430, the CPU executes processing of starting the operation of the engine 23. Subsequently, the CPU proceeds to step 435. Meanwhile, in the case where the engine 23 is being operated, the CPU makes a negative judgment (No) in step 425 and proceeds directly to step 435.

The CPU successively performs the processings of step 435 to step 460 which will be described later. After that, the CPU proceeds to step 495 and ends the present routine temporarily.

Step 435: The CPU determines a target engine rotational speed Ne* and a target engine torque Te* such that an output equal to the demanded engine output Pe* is output from the engine 23 and the operation efficiency of the engine 23 becomes the highest. Namely, the CPU determines the target engine rotational speed Ne* and the target engine torque Te* on the basis of the optimum engine operation point corresponding to the demanded engine output Pe*.

Step 440: The CPU calculates a target MG1 rotational speed Nm1* by substituting the ring gear rotational speed Nr and the target engine rotational speed Ne* into the above-described expression (1). Further, the CPU determines a target first motor torque (target MG1 torque) Tm1* which realizes the target MG1 rotational speed Nm1*.

Step 445: The CPU calculates a shortage torque which is the difference between the demanded ring gear torque Tr* and a torque which acts on the ring gear when the engine 23 generates a torque equal to the target engine torque Te*. Further, the CPU calculates a target second motor torque (target MG2 torque) Tm2* which is a torque to be generated by the second motor 22 so as to supplement the shortage torque.

Step 450: The CPU controls the engine 23 in such a manner that the engine torque Te generated by the engine 23 becomes equal to the target engine torque Te* and the engine rotational speed NE becomes equal to the target engine rotational speed Ne*.

Step 455: The CPU controls the first inverter 33 in such a manner that the torque Tm1 generated by the first motor 21 becomes equal to the target MG1 torque Tm1*.

Step 460: The CPU controls the second inverter 34 in such a manner that the torque Tm2 generated by the second motor 22 becomes equal to the target MG2 torque Tm2*.

(Case 2: Pe*≤Peth)

In the case where the demanded engine output Pe* is equal to or less than the output threshold Peth, when the CPU proceeds to step 420, the CPU makes a negative judgment (No) in step 420 and proceeds to step 465 so as to judge whether or not the engine 23 is being operated at the present.

In the case where the engine 23 is being operated, the CPU makes an affirmative judgment (Yes) in step 465 and proceeds to step 470 so as to execute processing of stopping the operation of the engine 23. After that, the CPU proceeds to step 475. Meanwhile, in the case where the engine 23 is in the stopped state, the CPU makes a negative judgment (No) in step 465 and proceeds directly to step 475.

In step 475, the CPU sets the value of the target MG1 torque Tm1* to "0." Further, the CPU proceeds to step 480 and calculates the target MG2 torque Tm2* which is the torque to be generated by the second motor 22 so as to make the torque acting on the ring gear equal to the demanded ring gear torque Tr*. Subsequently, the CPU proceeds to step 455 to step 460.

(Specific Operation—Search of Target Downhill Section by Travel Assisting Apparatus)

Next, specific operation of the travel assisting apparatus 60 will be described.

Figure 7:
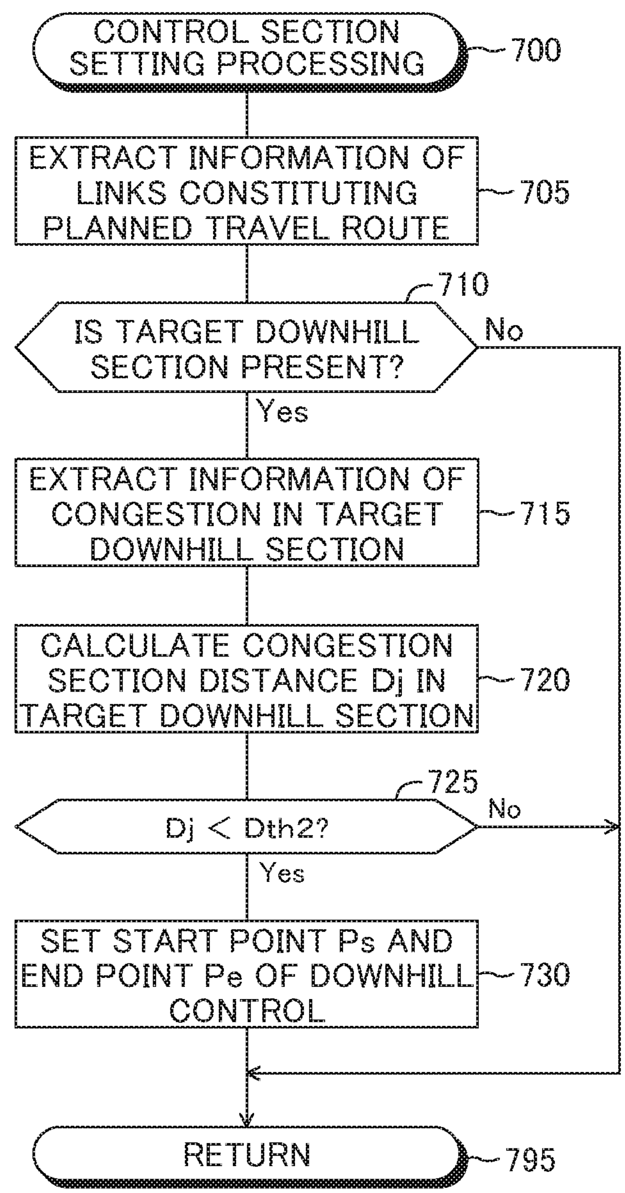
FIG. 7 is a flowchart showing target downhill search processing executed by the present control apparatus.

The CPU 66 of the computation section 61 executes a "control section setting processing routine" represented by the flowchart of FIG. 7 when the driver enters a destination and when the vehicle 10 passes through the end point of a target downhill section searched already.

Accordingly, when a proper timing comes, the CPU 66 starts the processing from step 700 of FIG. 7 and proceeds to step 705 so as to extract, from the map database, a planned travel route (a combination of links) extending from the present position Pn to the destination. Notably, in the case where the present routine is executed for the first time after the entry of the destination, the CPU 66 determines a planned travel route on the basis of the present position Pn and the destination and extracts a combination of links of the planned travel route. Subsequently, the CPU 66 proceeds to step 710 and determines whether or not "a target downhill section located forward of a point on the planned travel route which is separated from the present position Pn by the pre-use distance Dp" is present.

In the case where a target downhill section is present, the CPU 66 makes an affirmative judgment (Yes) in step 710 and proceeds to step 715. In step 715, the CPU 66 extracts information relevant to congestion which occurs in the target downhill section from congestion information which is received by the traffic information receiving section 63. Subsequently, the CPU 66 proceeds to step 720 and calculate the congestion section distance Dj. When a plurality of congestions occurs in the target downhill section, the CPU 66 calculates the congestion section distance Dj by means of aggregating each distance of these congestion sections.

Subsequently, the CPU 66 proceeds to step 725 and judges whether or not the congestion section distance Dj is less than the distance threshold Dth2. When the congestion section distance Dj is less than the distance threshold Dth2, the CPU 66 makes an affirmative judgment (Yes) in step 725 and proceeds to step 730.

In step 730, the CPU 66 sets, as the start point Ps of the downhill control, a point on the planned travel route which is shifted back from the start point of the target downhill section by the pre-use distance Dp. In addition, the CPU 66 sets the end point of the target downhill section as the end point Pe of the downhill control. The set start point Ps and the set end point Pe are stored in the RAM 68.

Subsequently, the CPU 66 proceeds to step 795 and ends the present routine. Notably, in the case where no target downhill section is present, the CPU 66 makes a negative judgment (No) in step 710 and proceeds directly to step 795. In addition, when the congestion section distance Dj is not less than the distance threshold Dth2, the CPU 66 makes a negative judgment (No) in step 725 and proceeds directly to step 795.

(Specific Operation—Execution of Downhill Control by Travel Assisting Apparatus)

Figure 8:
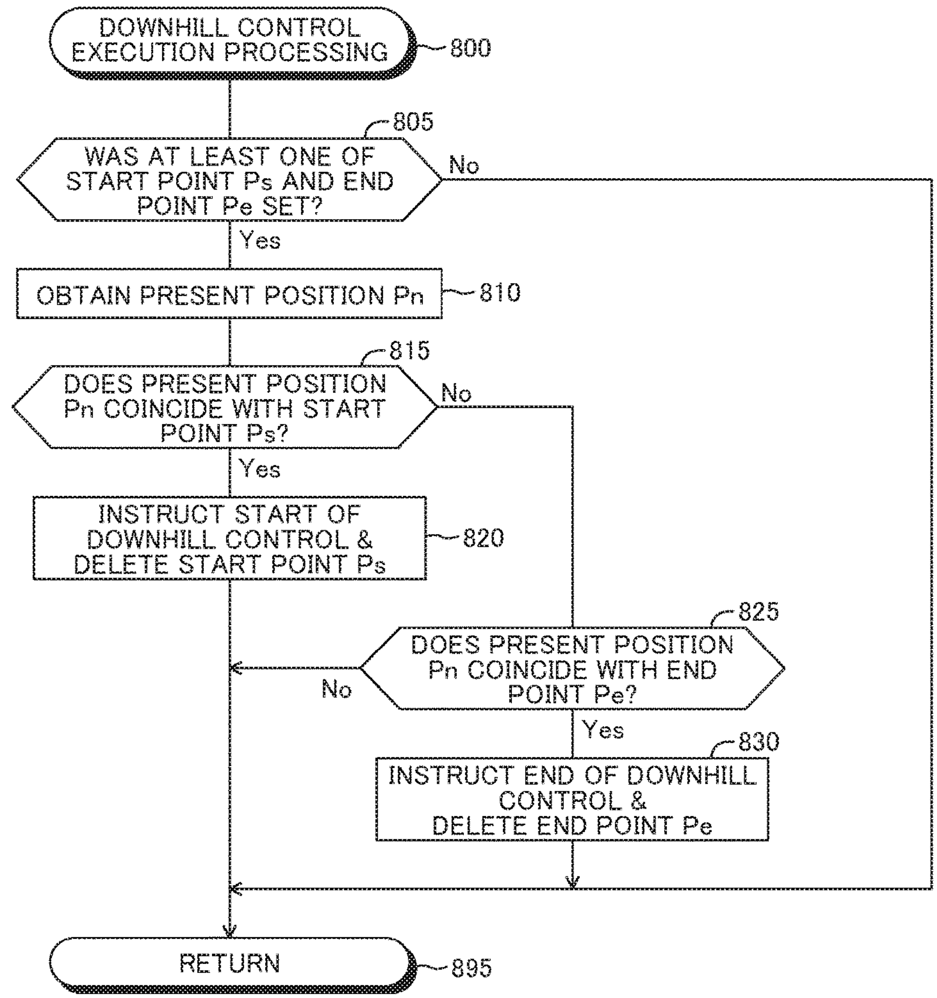
FIG. 8 is a flowchart showing downhill control execution processing executed by the present control apparatus.

In order to execute the downhill control, the CPU 66 executes a "downhill control execution processing routine" represented by the flowchart of FIG. 8 every time a predetermined period of time elapses. Accordingly, when a proper timing comes, the CPU 66 starts the processing from step 800 of FIG. 8 and proceeds to step 805 so as to judge whether or not at least one of the start point Ps and end point Pe of the downhill control section has been set.

In the case where at least one of the start point Ps and end point Pe has been set, the CPU 66 makes an affirmative judgment (Yes) in step 805 and proceeds to step 810. In step 810, the CPU 66 obtains the present position Pn which is obtained by the GPS receiving section 62. Subsequently, the CPU 66 proceeds to step 815 and judges whether or not the present position Pn coincides with the start point Ps.

In the case where the present position Pn coincides with the start point Ps (in actuarially, falls with a range of "the start point Ps—several tens of meters" to "the start point Ps+several tens of meters"), the CPU 66 makes an affirmative judgment (Yes) in step 815 and proceeds to step 820 so as to instruct the ECU 40 to start the downhill control. The ECU 40 having received the instruction changes the target remaining capacity SOC* from the standard remaining capacity Sn to the low-side remaining capacity Sd by executing an unillustrated routine. Further, the CPU 66 deletes the data of the start point Ps. Subsequently, the CPU 66 proceeds to step 895 and ends the present routine temporarily.

Meanwhile, in the case where the present position Pn does not coincide with the start point Ps (including the case where the start point Ps has been deleted), the CPU 66 makes a negative judgment (No) in step 815 and proceeds to step 825 so as to judge whether or not the present position Pn coincides with the end point Pe.

In the case where the present position Pn coincides with the end point Pe, the CPU 66 makes an affirmative judgment (Yes) in step 825 and proceeds to step 830 so as to instruct the ECU 40 to end the downhill control. The ECU 40 having received the instruction changes the target remaining capacity SOC* from the low-side remaining capacity Sd to the standard remaining capacity Sn by executing an unillustrated routine. Further, the CPU 66 deletes the data of the end point Pe. Subsequently, the CPU 66 proceeds to step 895.

In the case where none of the start point Ps and the end point Pe has been set, the CPU 66 makes a negative judgment (No) in step 805 and proceeds directly to step 895. In addition, in the case where the present position Pn does not coincide with the end point Pe, the CPU 66 makes a negative judgment (No) in step 825 and proceeds directly to step 895.

As described above, the present control apparatus (the ECU 40 and the travel assisting apparatus 60) is a hybrid vehicle control apparatus applied to a hybrid vehicle which includes an internal combustion engine (23) and a motor (the first motor 21 and the second motor 22) as drive sources of the vehicle, includes a storage battery (31) for supplying electric power to the motor, and is configured to perform regenerative braking by using the motor, and charge the storage battery with electric power generated as a result of the regenerative braking and electric power generated by using output of the internal combustion engine. The hybrid vehicle control apparatus comprises a control portion which controls the internal combustion engine in such a manner that the storage battery is charged and the remaining capacity (SOC) of the storage battery approaches a predetermined target remaining capacity (SOC*, the standard remaining capacity Sn). The control portion obtains a planned travel route of the vehicle. In the case where a target downhill section is contained in the planned travel route, the control portion executes downhill control when the vehicle travels in a particular section of a section which extends to the end point (Pe) of the target downhill section from a downhill control start point (Ps) which is shifted back from the start point of the target downhill section by a predetermined distance. The particular section contains at least a section extending from the downhill control start point to the start point of the target downhill section, and the downhill control changes the target remaining capacity to a remaining capacity smaller as compared with the case where the vehicle travels in sections other than the particular section (the low-side remaining capacity Sd).

In addition, the control portion obtains traffic congestion information which represent a congestion section (step 715 of FIG. 7), and the control portion prohibits execution the downhill control when the target downhill section contains one or more congestion sections and the total distance of the congestion sections contained in the target downhill section is greater than a predetermined distance threshold (step 725 of FIG. 7).

According to the present control apparatus, when congestion section is contained in a target downhill section, by means of executing the specific control, the possibility that the remaining capacity SOC reaches the remaining capacity lower limit Smin can be decreased, whereby the possibility that deterioration of the storage battery 31 is accelerated can be decreased.

Modification of Embodiment

Next, a modification of the embodiment will be described.

The computation section 61 of the travel assisting apparatus 60 executes the downhill control when the congestion section distance Dj is less than the distance threshold Dth2. In contrast, the computation section 61 according to the present modification is different from the above-described embodiment only in that the computation section 61 according to the present modification executes the downhill control when the congestion section distance Dj is less than a distance threshold Dth3 which is proportional to the target downhill section distance Dd. Hereinafter, the difference will be mainly described.

A "control section setting processing routine" which the computation section 61 according to the present modification executes will be described with reference to the flowchart of FIG. 9. Each step shown in FIG. 9 at which the same processing is performed as each step shown in FIG. 7 is given the same step symbol as one given to such step shown in FIG. 7.

Figure 9:
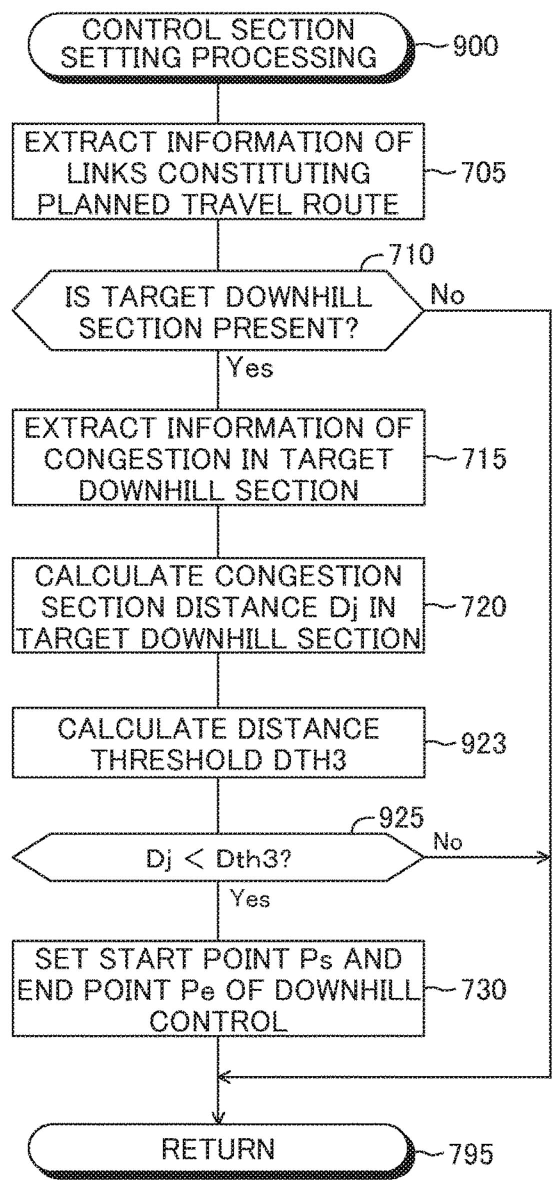
FIG. 9 is a flowchart showing target downhill search processing executed by the present control apparatus.

Accordingly, when a proper timing comes, the CPU 66 starts the processing from step 900 of FIG. 9 and proceeds to step 705. After the execution of step 720, the CPU 66 proceeds to step 923 so as to calculate the distance threshold Dth3. More specifically, the CPU 66 calculates the distance threshold Dth3 as the product of a proportionality factor k ($0<k<1$) and the target downhill section distance Dd (namely, Dth3=k×Dd).

In the present example, the proportionality factor k is set such that the following relationship is established. Namely, although the vehicle 10 travels the target downhill section containing a congestion section, when the ratio of "the distance of the congestion section contained in the target downhill section" to "the distance of target downhill section" is less than the proportionality factor k, the remaining capacity SOC can be increased due to regenerative braking.

Subsequently, the CPU 66 proceeds to step 925 and judges whether or not the congestion section distance Dj is less than the distance threshold Dth3. When the congestion section distance Dj is less than the distance threshold Dth3, the CPU 66 makes an affirmative judgment (Yes) in step 925 and proceeds to step 730. Namely, in this case, the downhill control is executed.

Meanwhile, when the congestion section distance Dj is equal to or greater than the distance threshold Dth3, the CPU 66 makes a negative judgment (No) in step 925 and proceeds directly to step 795. Namely, in this case, the downhill control is not executed.

Accordingly, although the target downhill section distance Dd is long, the present modification can increase opportunities where it is properly determined whether or not the specific control must be executed. More specifically, although the congestion section distance Dj is long, when the target downhill section distance Dd is long as compared with the congestion section distance Dj, since it is highly likely that the remaining capacity SOC can be increased due to regenerative braking during traveling of the target downhill section, the downhill control is executed.

Although the embodiment of the hybrid vehicle control apparatus according to the present disclosure have been described, the present subject matter is not limited to the above-described embodiments and may be changed in various ways without departing from the scope of the present subject matter. For example, the travel assisting apparatus 60 in the present embodiment receives signals from GPS satellites. However, the travel assisting apparatus 60 may receive other satellite positioning signals in place of or in addition to the GPS signals. For example, the other satellite positioning signals may be GLONASS (Global Navigation Satellite System) and QZSS (Quasi-Zenith Satellite System).

The traffic information receiving section 63 in the present embodiment receives the VICS information as traffic congestion information provided from the outside of the vehicle 10. However, the traffic information receiving section 63 may receive traffic congestion information through other means in place of or in addition to the VICS information. For example, the traffic information receiving section 63 may receive traffic congestion information through mobile communication network (mobile telephone network).

The distance threshold Dth2 in the present embodiment is the fixed value. However, the distance threshold Dth2 may be a value that varies. For example, the distance threshold Dth2 may vary according to whether the target downhill section is on an express highway or on an ordinary road.

The distance threshold Dth3 in the present embodiment is calculated as the product of a proportionality factor k and the target downhill section distance Dd. However, the distance threshold Dth3 may be a value of the product of a proportionality factor k and the target downhill section distance Dd plus a predetermined value.

In the example of FIG. 3, the congestion section starts at the midway of link 4 and ends up at the midway of link 6. Namely, each of the start point and the end point of the congestion section is located midway of link respectively. However, the travel assisting apparatus 60 may deal with information whether congestion occurs or not per link. Namely, when congestion occurs in a link, the travel assisting apparatus 60 may regard the whole link as the congestion section or a part of the congestion section.

In the present embodiment, when the vehicle 10 has reached the start point Ps of a downhill control section or the end point Pe thereof, the travel assisting apparatus notifies the ECU 40 of the fact that the vehicle 10 has reached the start point Ps or the end point Pe. However, when the travel assisting apparatus decides to execute the downhill control, the travel assisting apparatus may notify the ECU 40 of the distance from the present position Pn to the start point Ps and the distance from the present position Pn to the end point Pe. In this case, the ECU 40 may obtain the distances from the present position Pn at that point in time to the start point Ps and the end point Pe on the basis of the travel distance of the vehicle 10 obtained by integrating the vehicle speed Vs with respect to time, and change the value of the target remaining capacity SOC* when the vehicle 10 reaches the start point Ps or the end point Pe.

The map database in the present embodiment contains the length and gradient of each link. However, the map database may contain the heights of opposite ends of each link instead of the gradient of each link.

In the case where the downhill control is executed in the present embodiment, the target remaining capacity SOC* is changed from the low-side remaining capacity Sd to the standard remaining capacity Sn when the vehicle 10 reaches the end point of each target downhill section. However, in the case where the downhill control is executed, the target remaining capacity SOC* may be changed from the low-side remaining capacity Sd to the standard remaining capacity Sn when the vehicle 10 reaches the start point of each target downhill section. Alternatively, in the case where the downhill control is executed, the target remaining capacity SOC* may be changed from the low-side remaining capacity Sd to the standard remaining capacity Sn when the vehicle 10 is located midway in each target downhill section.

The map database in the present embodiment is constituted by a hard disk drive. However, the map database may be constituted by a solid state drive (SSD) using a recording medium such as flash memory or the like.

What is claimed is:

1. A hybrid vehicle control apparatus applied to a hybrid vehicle which includes an internal combustion engine and a motor as drive sources of said hybrid vehicle, includes a storage battery for supplying electric power to said motor, and is configured to perform regenerative braking by using said motor, and charge said storage battery with electric power generated as a result of said regenerative braking and electric power generated by using output of said internal combustion engine, said hybrid vehicle control apparatus comprising a control portion which controls said internal combustion engine in such a manner that said storage battery is charged and a remaining capacity of said storage battery approaches a predetermined target remaining capacity, said control portion obtaining a planned travel route of said hybrid vehicle, in the case where a target downhill section is contained in said planned travel route, said control portion executing downhill control when said hybrid vehicle travels in a particular section of a section which extends to an end point of said target downhill section from a downhill control start point which is shifted back from a start point of said target downhill section by a predetermined distance, said particular section containing at least a section extending from said downhill control start point to the start point of said target downhill section, and said downhill control changing said predetermined target remaining capacity to a remaining capacity smaller as compared with the case where said hybrid vehicle travels in sections other than said particular section, wherein said control portion obtains traffic congestion information which represent a congestion section, and said control portion prohibits execution of said downhill control when said target downhill section contains one or more congestion sections and a total distance of said one or more congestion sections contained in said target downhill section is greater than a predetermined distance threshold.

2. The hybrid vehicle control apparatus according to claim 1, wherein said control portion is configured to set said predetermined distance threshold on the basis of a value which is proportional to a distance of said target downhill section containing said congestion section.

* * * * *